(12) United States Patent
Recce

(10) Patent No.: US 7,155,034 B1
(45) Date of Patent: *Dec. 26, 2006

(54) AUTHORIZED PERSONNEL BIOMETRIC DETECTION SYSTEM PREVENTING UNAUTHORIZED USE OF AIRCRAFT AND OTHER POTENTIALLY DANGEROUS INSTRUMENTS

(75) Inventor: Michael Recce, South Orange, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 722 days.

This patent is subject to a terminal disclaimer.

(21) Appl. No.: 10/406,613

(22) Filed: Apr. 3, 2003

Related U.S. Application Data

(63) Continuation-in-part of application No. 09/858,682, filed on May 16, 2001, now Pat. No. 6,563,940.

(51) Int. Cl.
*G06K 9/00* (2006.01)

(52) U.S. Cl. ............... 382/115; 180/19.2; 382/218; 473/201

(58) Field of Classification Search .......... 341/20; 382/115, 119, 121; 180/19.2; 473/201, 202
See application file for complete search history.

(56) References Cited

U.S. PATENT DOCUMENTS

| | | | |
|---|---|---|---|
| 3,939,679 A | 2/1976 | Barker et al. | |
| 4,003,152 A | 1/1977 | Barker et al. | |
| 4,067,132 A | 1/1978 | Smith | |
| 4,105,885 A | 8/1978 | Orenstein | |
| 4,135,320 A | 1/1979 | Smith | |
| 4,141,166 A | 2/1979 | Schultz | |
| 4,154,014 A | 5/1979 | Smith | |
| 4,457,091 A | 7/1984 | Wallerstein | |
| 4,467,545 A | 8/1984 | Shaw, Jr. | |
| 4,488,370 A | 12/1984 | Lemelson | |
| 4,563,827 A | 1/1986 | Heltzel | |
| 4,682,435 A | 7/1987 | Heltzel | |
| 4,970,819 A | 11/1990 | Mayhak | |
| 5,216,422 A * | 6/1993 | Kaye | 341/20 |
| 5,316,479 A | 5/1994 | Wong et al. | |

(Continued)

*Primary Examiner*—Gregory Desire
(74) *Attorney, Agent, or Firm*—Klauber & Jackson

(57) ABSTRACT

An authorized pilot detection system and method for controlling a variety of potentially dangerous instrumentalities such as aircraft, land vehicles, amphibious vehicles and other hand-controllable equipment, is disclosed. The system with respect to aircraft includes an interlock for enabling/disabling one of a control wheel and a joystick for controlling movement of an aircraft; a biometric grip detector arranged on said one of a control and joy stick, said biometric grip detector comprising a plurality of pressure sensors for sensing a handgrip of a user on said one of a control wheel and joystick; a comparator for comparing a pressure signature profile compiled from an output from the plurality of pressure sensors with at least one pressure signature profile including: (a) hand position of the user's handgrip on said one of a control wheel and joystick as indicated by a change in pressure on at least one of the plurality of pressure sensors; (b) pressure as a function of position on the control wheel and joystick; and (c) pressure as a function of time. A control unit may disable the interlock to permit at least partial manual control of movement of the aircraft by the control wheel/joy stick when the comparator indicates that the signature profile matches at least one pressure signature profile in storage. Authorized access to other hand operated equipment such as power tools and heavy equipment are prevented according to the present invention.

30 Claims, 12 Drawing Sheets

U.S. PATENT DOCUMENTS

| | | |
|---|---|---|
| 5,603,179 A | 2/1997 | Adams |
| 6,185,852 B1 | 2/2001 | Whalen et al. |
| 6,360,468 B1 | 3/2002 | Constant et al. |
| 6,563,940 B1 * | 5/2003 | Recce ..................... 382/120 |
| 6,716,034 B1 * | 4/2004 | Casanova et al. ........... 434/252 |
| 6,763,126 B1 * | 7/2004 | Recce ..................... 382/120 |
| 6,817,130 B1 * | 11/2004 | Ivanov ..................... 42/70.06 |
| 2002/0170220 A1 * | 11/2002 | Recce ..................... 42/70.08 |
| 2003/0133598 A1 * | 7/2003 | Recce ..................... 382/115 |
| 2004/0031180 A1 * | 2/2004 | Ivanov ..................... 42/70.11 |
| 2005/0084138 A1 * | 4/2005 | Inkster et al. ............... 382/115 |

* cited by examiner

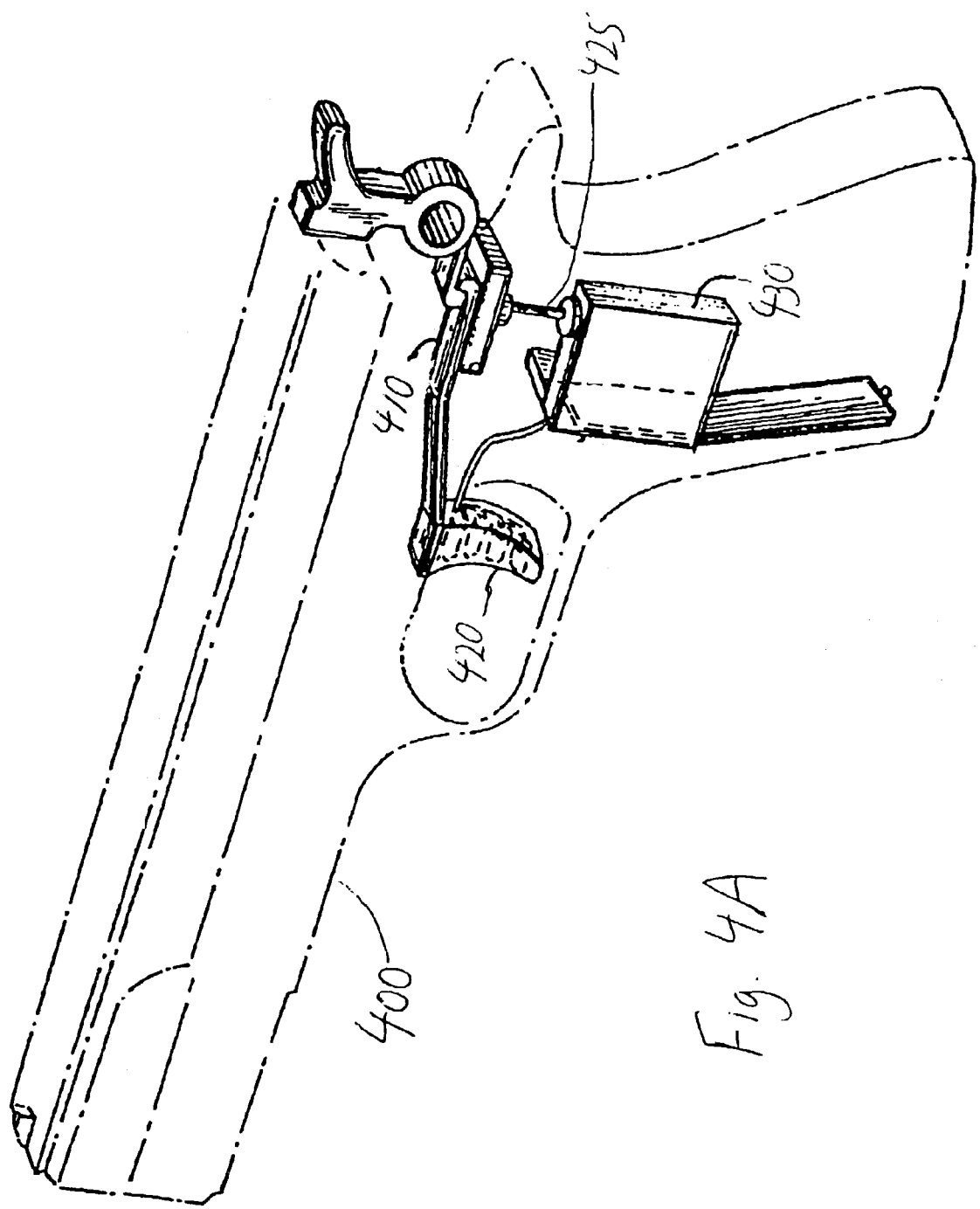

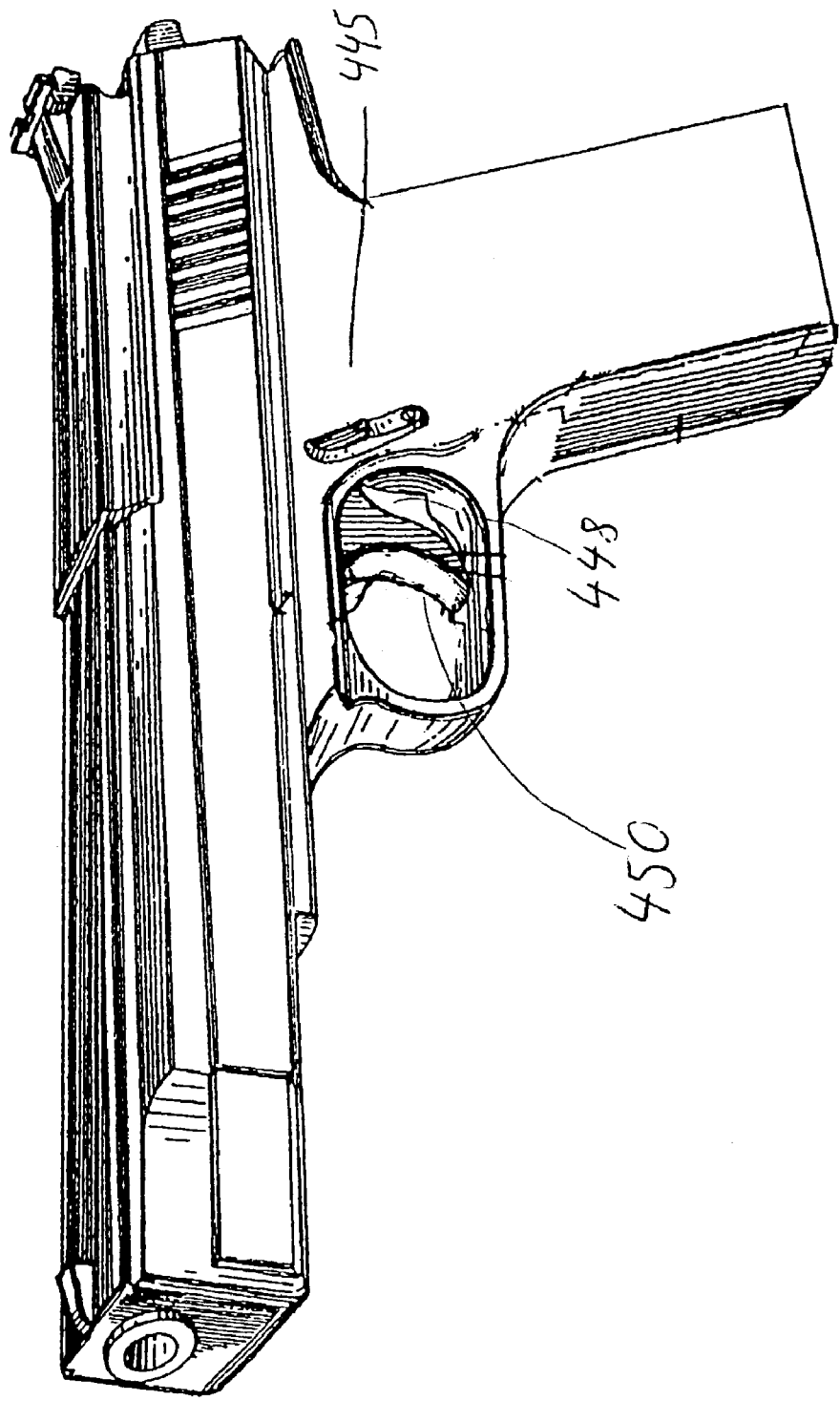

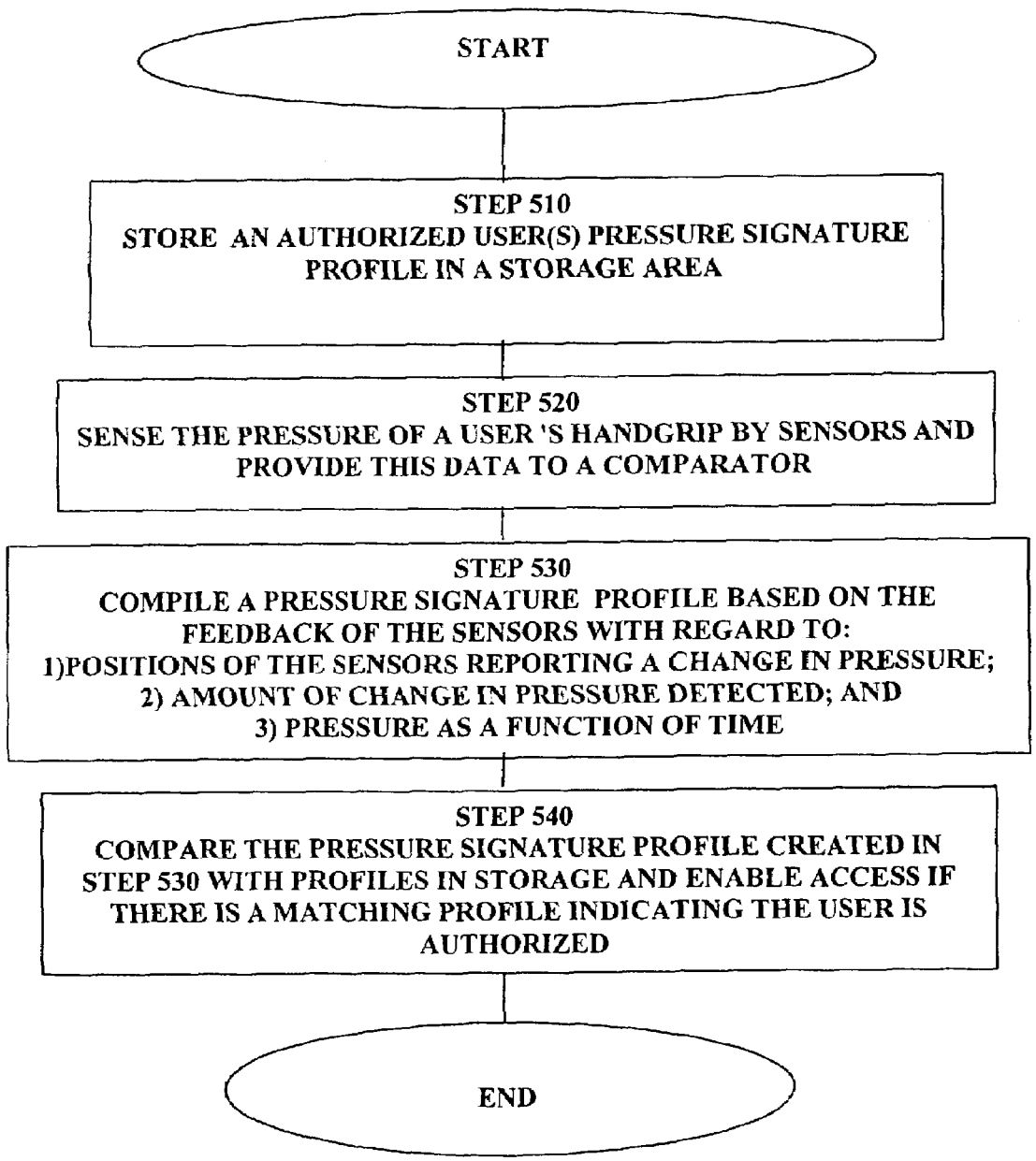

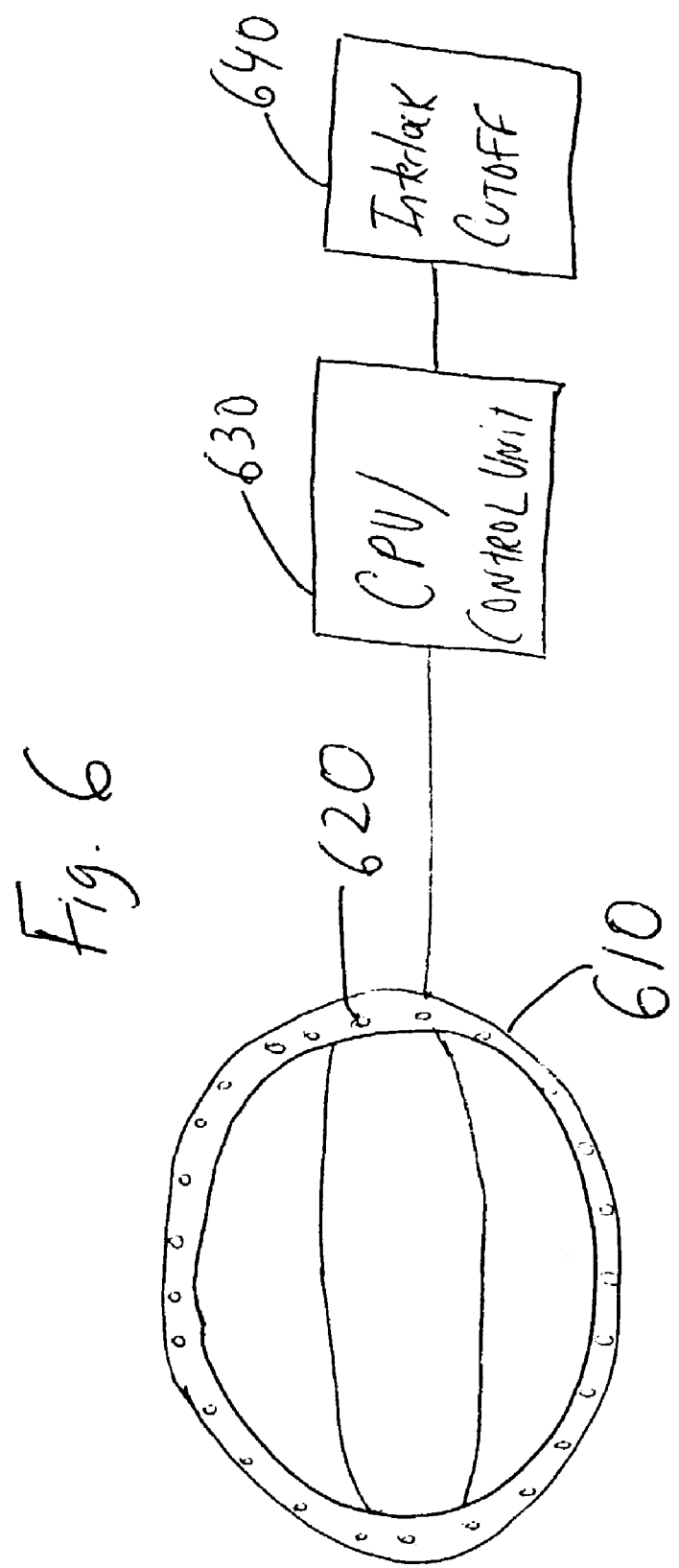

AUTHORIZED PERSONNEL BIOMETRIC DETECTION SYSTEM PREVENTING UNAUTHORIZED USE OF AIRCRAFT AND OTHER POTENTIALLY DANGEROUS INSTRUMENTS

RELATED APPLICATION

This application is a continuation-in-part of application Ser. No. 09/858,682 filed May 16, 2001, now U.S. Pat. No. 6,563,940, the disclosure of which is incorporated herein by reference in its entirety. Applicant claims the benefit hereof under 35 U.S.C. § 120.

BACKGROUND OF THE INVENTION

1. Field of the Invention

The present invention relates to security systems for preventing unauthorized access and/or use of certain machinery and/or equipment. More particularly, the present invention relates to preventing access and/or use of aircraft and potentially dangerous instruments.

2. Description of the Related Art

The tragic events that took place on Sep. 11, 2001 in the United States resulted in more than 3,000 lives lost because of the unauthorized hijacking of aircraft and the subsequent use of the aircraft as weapons to cause massive amounts of fatalities. Aircraft, as well as other common carriers (e.g. trains, buses, cruise ships, tractor trailers) are all necessary instruments of modern day life, yet if commandeered by terrorists, can cause substantial casualties of men, women and children.

Despite the best efforts of airlines and airports to screen passengers, there may never be an absolute way to prevent future atrocities. Furthermore, evidence has surfaced that plans were made to hijack tractor-trailers carrying hazardous materials, such as nuclear waste, and crash/explode these trucks in heavily populated areas to maximize injury and death to civilians.

In addition, in a somewhat different vein, every year children are severely injured/killed by handling dangerous instruments used in normal day to day activities, such as power tools, electric saws, drills, rivet guns, etc. because the adult owner of the tool either fails to keep the tools away from a child's access, whether that be momentary or ongoing.

All too often there are tragic news reports of people who are gravely injured or killed by gunshots fired by a person who is not the owner or an authorized user of the firearm. Some of these tragedies are accidental, such as when a child finds a parent's firearm and accidentally discharges it at his/herself or at friends. Other tragedies concern firearms, which are taken during burglaries, which are subsequently, used in future robberies and/or homicides. On more than one occasion, a perpetrator has been known to wrestle the gun from an officer's holster and use it against the officer.

Regardless of the specific cause, it is evident that many of these incidents could be avoided if the firearm could only be fired by the owner or other authorized user of the gun. In fact, there is in fact a current effort by citizens and lawmakers to require the inclusion of trigger locks on handguns.

U.S. Pat. No. 4,970,819 to Mayhak discloses a system for sensing the grip pattern of the hand of a potential user of a firearm and permits the firing thereof if it senses a particular grip pattern of an authorized user, which it has been programmed to recognize. The system includes grip pattern sensing means on the handgrip of the firearm, a simulated neural network memory capable of recognizing a particular grip pattern and a microprocessor for accessing the neural network to inquire whether it recognizes the grip pattern being sensed by the sensing means. The microprocessor also controls means for permitting and preventing actuation of the firing mechanism of the firearm to allow the firearm to be discharged only when the grip pattern sensed by the sensing means is that of the authorized user which the simulated neural network memory has been programmed to recognize.

According to the '819 patent, "a simulated neural network does not possess a memory in the sense that a computer has a memory. Instead, the training of a pattern recognition neural network involves repeatedly subjecting its input neurons to signals corresponding to the pattern, including variations thereof. This establishes interconnections between the input neurons, the hidden neurons and the output neuron, so that, eventually, when the trained network is subjected to a pattern signal the output is either "yes" or "no" that it is or is not the pattern it has been trained to recognize. A trained neural network will exhibit a particular pattern of interconnections between neurons therein and the pattern of connection strengths between neurons is equivalent to memory for that network" (col. 3 lines 34–48 of the '819 patent).

Furthermore, according to the '819 disclosure, once the neural network has been trained to recognize a particular pattern, it can do so even though it later is presented with small variations or incomplete information about that pattern. The neural network is thus ideally suited for recognizing a particular handgrip pattern impressed on sensing means 23 even though the authorized user may place his hand in a slightly different location or apply slightly different pressures with each grip. The neural network can be trained to take such variations into account and still distinguish the grip pattern for which it is programmed from grip patterns created by others who are not authorized to use the firearm" (from col. 3 lines 11–26 of the '819 patent).

U.S. Pat. No. 5,603,179 discloses a "safety mechanism for a firearm consisting of a specialized scanning mechanism built into the firearm's trigger. The scanner is programmed to read the unique fingerprints of a given individual. The device is also capable of holding the programmed print information for more than one person, so that multiple people would he able to use the firearm. However, usage is limited to only those persons whose handprints have been prestored in the scanner. The scanner mechanism is connected to the firearm's safety lock. The safety is prevented from being released without proper authorization from the scanner. When a person grips the weapon and places his finger on the trigger, the pressure of the finger on the trigger activates the scanner, and the scanner reads the fingerprint to determine if the scanned fingerprint matches one of the pre-stored fingerprint images. If the individual is an authorized user, the scanner transmits a signal to the safety, releasing this device and activating the firearm for use" (from abstract of the '179 patent).

U.S. Pat. No. 5,316,479 to Wong discloses a firearm training system, "which allows the measurement and display as a function of time of the hand grip force pattern applied to the grip of a firearm by a weapon hand of a shooter. This permits the detection of variations in the individual handgrip forces in the pattern during firing of the weapon. This firearm training system preferably also provides for the detection and display as a function of time of the position of the firearm trigger. The system includes separate force transducers for the side and front-to-back grip forces applied to the side surfaces and one of the front and back surfaces of the grip respectively as well as a trigger position sensor. A relative value of the hand grip forces detected by the transducers and a relative trigger position detected by the sensor are graphically displayed by the system as a function of time.

Wong discloses a method of training a shooter by determining the grip pattern of the shooter's weapon hand on a firearm by detecting a front-to-back grip force and a side grip force applied by the weapon hand and graphically displaying as a function of time a relative value of the front-to-back and side grip forces respectively. Thus, the system provides for a more effective training of a shooter, which substantially translates into cost savings in terms of training time and ammunition, especially since the firearm training system and method may effectively be used under both dry and live fire conditions" (See abstract of the '479 patent). The time period disclosed by Wong is relatively fixed, for example, 100 ms snapshot for each user training with the weapon. Wong provides feedback so that a shooter can see a "correct" way to hold the weapon and pull the trigger, as opposed to "incorrect" grips that could impair accuracy. Thus, Wong teaches a shooter how to conform to a predetermined method of holding and firing a weapon.

Accordingly, there exists a need to prevent unauthorized access to potentially dangerous instruments, which includes items that could be used as a weapon, such as aircraft and power tools from unauthorized use.

SUMMARY OF THE INVENTION

According to an embodiment of the present invention, a system and method prevents unauthorized control of an aircraft by using biometric sensing to detect the grip of the pilot, or co-pilots. If the system does not recognize the user attempting to control the aircraft, the plane automatically overrides instructions and uses the autopilot system to bring the plane to its intended destination. Optionally, the plane may also notify FAA or other authorities that unauthorized users have attempted to fly the aircraft, permitting the military time to scramble any jet fighters that might be needed to intercept the aircraft.

In another embodiment of the invention, power tools are provided with biometric detection to enable their actuation, so that the tool would be inoperable if an unauthorized user, such as for example a child, attempted to operate it.

In another embodiment, construction sites, long considered an attractive nuisance for children, are prevented from unauthorized use. Whether that unauthorized use is a teenager operating a bulldozer, or someone with a more sinister purpose in mind, both types of unauthorized use are effectively thwarted.

BRIEF DESCRIPTION OF THE DRAWINGS

FIGS. 4A, 4B and 4C illustrate variations of the present invention where the unauthorized user prevention device is connected to several types of safety mechanisms used in semi-automatic weapons.

FIG. 5 is a flowchart illustrating a method for unauthorized user prevention according to the present invention.

FIG. 6 illustrates an embodiment of the unauthorized user prevention device of the present invention used as an anti-theft device in an automobile.

DETAILED DESCRIPTION OF THE PREFERRED EMBODIMENTS

It should be noted that the following description and drawings are for purposes of illustration, not limitation. For example, the weapon prevention device is not limited to a handgun, and could also be used with a rifle or shotgun. In addition, the present invention is not limited to firearms or even devices that propel projectiles. For example, taser guns, acoustic wave weapons, laser weapons would be within the spirit of the invention and the scope of the appended claims. In addition, virtually any handheld or hand controlled device that a user must grip could be used for the prevention of unauthorized access, and there is no requirement that such device must primarily comprise a weapon. For example, the invention could also be used as an anti-theft device in automobiles where the authorized user(s) grip on the steering wheel could be recognized as a signature, which overrides an ignition or fuel cutoff switch. In addition, in the embodiments used to prevent unauthorized access/use of aircraft, the aircraft can be an airplane, jet, private plan, helicopter, ultralight, commercial or non-commercial aircraft. So long as the device has a potentially dangerous capability if used (or misused), such as aircraft, due to the sheer impact that can be caused even without explosion of the fuel, as well as the vessels carrying combustible fuel, radioactive waste, traveling on land, sea, air, or any combination thereof. With regard to power tools, by way of illustration and not limitation, drills, saws, torches, nail guns, paint sprayers, stamp machines, cutting machines, whether the tools are handheld or stationary, so long as there is a manual control or identity verification to obtain access, all of these items fall within the spirit of the invention and the scope of the appended claims.

Finally, it is noted that U.S. Pat. Nos.: (1) 6,185,851 B1, (2) 5,316,479, (3) 5,603,179, and (4) 4,870,819 are hereby incorporated by reference as disclosing background material regarding safety locks, trigger locks, and electronic/electro-mechanical pressure detection systems known in the prior art.

Figure 1:
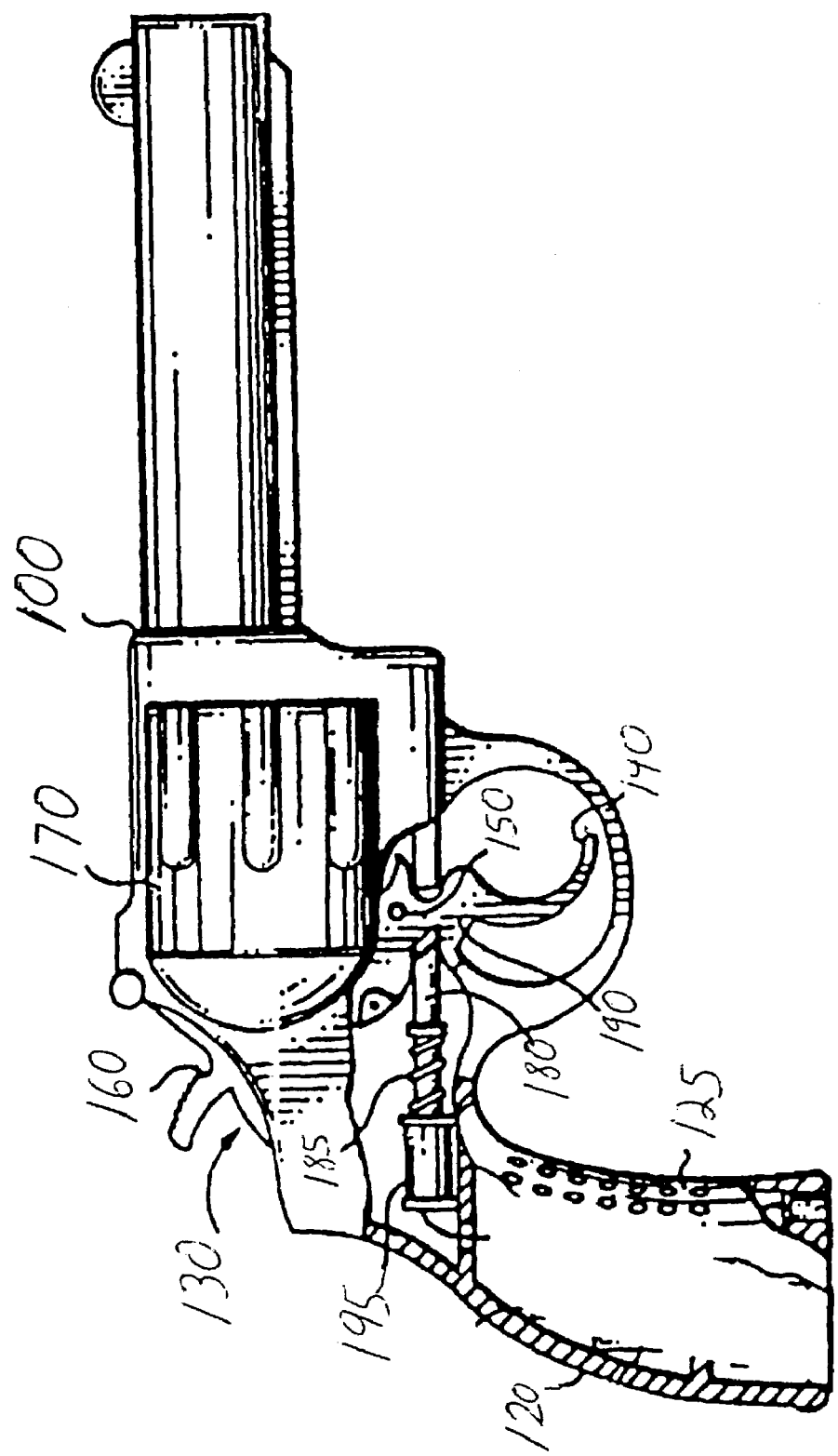
FIG. 1 is an elevational view of a firearm of an embodiment of the present invention.

FIG. 1 shows a firearm 100, which in this particular example is a handgun having a revolver design. The firearm is provided with a handgrip 120 and is fired when firing mechanism 130 is actuated. The firing mechanism 130 includes trigger 140, which is pivotally mounted in the frame of the gun at 150. Movement of the trigger 140 will cause a hammer 160 to be cocked and released, thus firing a bullet (not shown) stored in the cylinder 170.

The firearm 100 is provided with equipped with a safety, which is moved in and out of position to prevent and permit the actuation of the firing mechanism 130. As shown here, the safety is a sliding latch member 180 adapted to engage a portion 190 on trigger 140, which extends under the latch member 180. Latch member 180 is biased by a spring 185 to a position in which it is it is adjacent to portion 190, thereby preventing trigger 140 from being pulled, in which case it pivots around pivot 150 into the fired position. In effect, latch member 180 prevents actuation of the firing mechanism. This handgun is further provided with a solenoid 195 into which an end of latch member 180 is placed. When energized, solenoid retracts latch member 180, overcoming biasing force of spring 185, which removes the latch member 180 from the path of portion 190. With latch member 180 out of the path of portion 190, the trigger can be pulled, actuating the firing mechanism to discharge the firearm. The retraction of the solenoid, or any type of interlock system, is dependent upon recognition of the users as being authorized to use the weapon.

Figure 2:
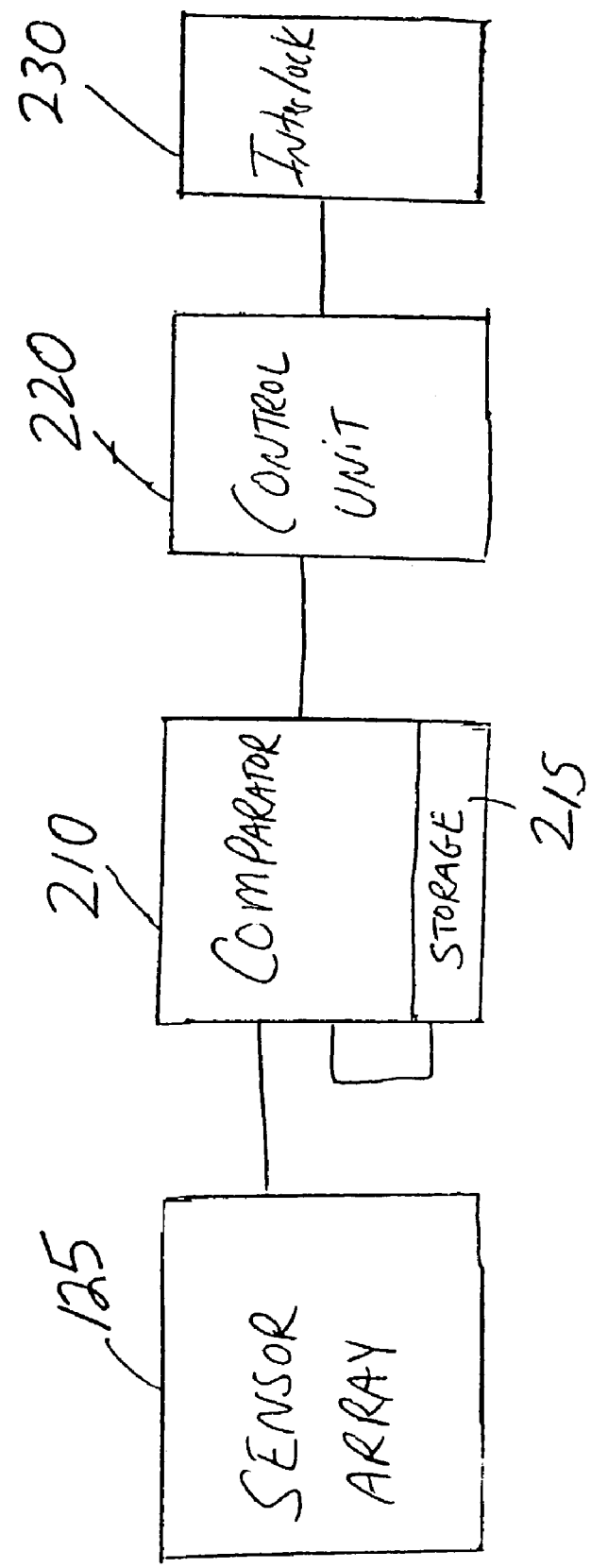
FIG. 2 illustrates a block diagram of the device according to the present invention.

FIG. 2 provides a block diagram of illustrating how the unauthorized user device of the present invention can operate. Sensor array 125, which is arranged in the handle of the weapon and may also be arranged in the trigger, or are part of a special retrofit grip for weapons made prior to the present invention, provide feedback information regarding the position, pressure, and duration of a person gripping the handle of the weapon. For all of the discussion in this application, the term "handgrip" is defined as the grip applied to the handle of a device (presumably but not necessarily limited to a weapon) that may also include the pressure asserted on the trigger as well as the pressure asserted on the handle of the weapon. The output from the sensors is provided to comparator 210, which compares these values with values previously stored in storage member 215.

When the comparator 210 finds a match (according to a predetermined variation either built into the device or chosen by user according to a sensitivity switch (not shown)) of the output with a value in storage, the comparator indicates this match to the control unit 220. The indication that there is a match could be, for example, a logic 1 or a logic 0 that is received by the control unit. In turn, the control unit will signal release interlock 230 so that the weapon can be fired.

In the case of the example illustrated in FIG. 1, the control unit/cpu 220 would energize the solenoid 195 and retract the latch member 180. It is possible that the control unit (which may or may not be separate from the cpu) could be programmed to have a limited sequence in which the weapon could be used, and once that time has passed, the control unit would again lock the interlock 230 and prevent the firing of the weapon.

The control unit/cpu 220 processes the electrical signals to develop a pressure signal profile including:

1) hand position of the user's handgrip on the particular device as indicated by a change in pressure on the sensor array/pressure sensors; and 2) pressure as a function of position on the gun handle; and 3) pressure as a function of time.

With regard to the three items disclosed above to develop a pressure signal profile, items 1 and 2 provide information regarding the area over which pressure is exerted by a given person, i.e.—the outline of the hand, the outline of the fingers (item 1) pressure on the handgrip, as manifested by the position of the hand on the handgrip, and any variances in the pressure applied by over the area (item 2) during a time interval. Item 3 shows pressure as a function of time, which is also critical because the time dimension magnifies the differences between individuals.

The pressure signature profile can permit a user to wear thin gloves and still be recognized as the authorized user, which would not be possible in fingerprint recognition systems of the prior art.

Together, the three elements of the profile (items 1–3) provide a unique pressure signal profile that no more than 1% of the population-at-large would possess. The sensors, including the piezoelectrics described above, produce a continuous analog output signal that varies in repeatable manner with applied load, and has a unique output for each level of applied pressure. The "pressure signature profile" is a composite signal that includes voltage changes, oscillation frequency changes, and frequency composition changes. The identification of an individual is performed using a statistical classifier that includes a set of computed weights and thresholds that separate the "pressure signature" of an individual from that of the rest of the population.

When a force is applied to the handgrip the sensors output an electrical signal to the control unit. In one embodiment the control unit may be a microprocessor or digital signal processor located within the firearm, for example, within the handgrip. The control unit compares it to the signal stored as the pressure profile of the lawful owner or authorized user. The microprocessor simultaneously reads the signals from all of the sensors and continuously searches for the dynamic pattern corresponding to the valid "pressure signature." Components of the sensor signal are multiplied by the computed weights and stored thresholds are applied. If the signal exceeds these computed thresholds then the firearm is allowed to fire during predetermined time interval (e.g. 500 milliseconds).

A motion sensor (not shown) could also be included, both to begin the process by activating the device, and after a certain period of time without any motion, to end it. Since a firearm is typically pointed down while in a holster, a predetermined tilt angle could be programmed in to activate the detection, or the mere squeezing of the grip while induce a voltage in the piezoeletric type sensors that could turn on the device.

In the above embodiment, to insure that only the lawful owner or other authorized user can fire the handgun, the handgrip 120 of the firearm 100 is provided under its surface with an array of sensors 125 that are provided on all four sides of the handgrip 120. However, while providing sensors on all four sides of the handgrip (and including a large number of them) will tend to allow a greater degree of sensitivity in terms of detection as to whether a user is authorized, there is not an absolute requirement that sensors must be arranged on all sides of the item being gripped, nor must the sensor total a particular number. In one aspect of the invention, a number of sensors (less than 20) are used in locations that maximally distinguish between subject's hand size and pressure patterns.

In another aspect of the invention, a high density of pressure sensors are used to full and uniformly cover the grip area of the handgun, or item to be gripped, as the case may be.

In another embodiment, suitable sensors include a sensing element into which a piezoelectric element has been embedded. Suitable piezoelectric elements include quartz crystals. Other suitable piezoelectric materials including lead titinate and lead zirconate, could be used in either a crystalline or film form. The pressure signal could also be measured from strain gauges or micro-machined pressure sensors (MEMS).

Systems employing piezoelectric materials, such as the crystals described above, produce an electrical output when they experience a change in load, i.e., pressure. Making use of this phenomenon, an embodiment of the present invention includes the transmission of electrical signal from the sensors, in response to pressure applied when a person grips the handle of the firearm, to a control unit located within the firearm. A purpose-built electronic circuit is used to convert the voltage and frequency changes measured from the sensors into a digital signal read by the processor. An electrostrictive system could also be employed.

In addition, the sensors could comprise acoustic resonators, which sense the resonance properties in the pressure differential caused by the particular grip. Acoustic resonance is a known phenomenon exhibited by an acoustic system, in which the response of the system to sound waves becomes very large when the frequency of the sound approaches a natural vibration frequency of the air in the system.

This "pressure signature" signal is programmed into the handgun by an independent station that is held by the authority that registers handguns. Such authority, for example, could be a state or local entity, or even an authorized third party. The owner of the handgun fires the gun ten to twenty times, and the pressure patterns unique to that individual are computed by a purposely-built data acquisition and analysis system. It is protected from abuse by one of several possible mechanisms, including encryption of the stored signal and tamper detection systems that can completely disable the firearm.

Grip pattern signals from sensing means 125 are fed from the firearm 100 over a line 129 to the host computer. A jack 131 in the butt of firearm handgrip 120 permits line 129 to be connected to the firearm.

The pressure sensors and central processing unit/control unit within the handgun are powered by a power source, typically a battery system (not shown) that could be located in the ammunition clip of the handgun. This arrangement allows the battery to be recharged in empty ammunition clips that are not in use.

It is understood by persons of ordinary skill in the art that a power source could be arranged in any internal location of the weapon/device, such as in the handle. There could be a small external plate that may allow the gun to be recharged while either in a carrying case or holster. In a "wrap around" version, where the unauthorized user prevention device is fitted onto or around a handle of the weapon, the power source would be external to the weapon handle but would be at least partially covered by the wrap around material, that could be, for example, a flexible material such as a plastic or a rubber.

Furthermore, in order to reduce the need to charge or replace batteries, there can be a motion sensor (not shown) arranged in or on the weapon, the motion sensor turning on the power only when the handgun is not stationary.

Figure 3:
FIG. 3 illustrates a graph of the measured pressure versus time.

FIG. 3 shows a graph of pressure versus time. A person of ordinary skill in the art would know the values in p.s.i. or its metric equivalent for the given timeframe. On the Y-axis are the separate pressure sensor and the X-axis represents time. It can be seen at approximately 160 ms the several are indicating a change in pressure differential by the voltage change, which would occur when a user grips the handle and causes, for example, piezoelectric material to resonate at a particular frequency that causes a voltage change sensed by a comparator.

As previously disclosed, this detected grip may be from the pressure applied to the handle and may or may not include, the actual pulling of the trigger (to the extent it would be movable despite having an interlock preventing movement sufficient to fire the weapon. It is also within the spirit and scope of the invention that the trigger may contain pressure sensors as well, and the pressure signature profile would be the outputs of the sensors from the handle and on the trigger. In addition, when the user pulls on the trigger, that action could either activate the unauthorized prevention device to turn on/supply power to the control unit/cpu, etc.

As shown in FIG. 3, there are elevated levels of pressure sensed by the pressure sensors while pressure is applied. The duration of the grip, the duration of the elevated pressure levels, and the specific sensors which sense the elevated pressure are used in determining the pressure signature profile.

According to the present invention, a pressure signature profile is based on the above three items that are feed back to the control unit/cpu from the sensors. According to the present invention, persons applying the same amount of pressure but at different points in time and at different locations on the handle would have a different pressure signature signal profiles than the example shown in FIG. 3. Accordingly, such a pressure signal profile would be compared against the profile(s) in storage to determine whether a user is authorized.

It is envisioned that only a limited number of attempts would be permitted before "locking out" the device until reset by a central controller. This would reduce the possibility of someone attempting to apply various positions and pressures until they stumble upon a successful outcome.

According to the present invention, even with a 1% chance of two people having the same pressure profile signature, the odds of a child having a pressure signature profile which matches that of an adult would be significantly less than 1%; in fact the odds would be nearly astronomical. A young child normally has a much smaller hand than that of the average adult (both length and girth of fingers and palm), so that the many of the pressure sensors experiencing a change in pressure when a child squeezes the handle would be not be the same as when an adult squeezes the handle. Factoring in the third item (time) with the other two items, the device would effectively prevent children from being able to fire the weapon. Finally, a limited number of retries would prevent a more mature child (i.e. teenager) from trying to figure out the pattern.

FIG. 4A shows one way that the present invention may work on a semi-automatic weapon 400, having an internal trigger lock 410. The trigger 420 would be prevented from movement by a safety latch 425, which is received in a through-hole of the trigger lock 410. On the opposite end, the latch extends from solenoid 430 and after a matching pressure profile is detected, the solenoid would retract the latch 425, thus permitting the trigger to be moved back toward the handle to fire the weapon.

The solenoid would be controlled by a control unit/cpu 440 similar to the description of the unauthorized user prevention device described for a revolver. The user's grip of the handle would be sensed in a similar manner as described above. A battery (not shown) could be in the ammunition clip or separately located in a compartment.

Further, the solenoid would remain extended in the case of a dead battery, so that if a child should inadvertently find a weapon stored somewhere in the house for a period of time where it was unattended or forgotten, there would be no possibility of firing the weapon. As a precaution for the authorized user, battery indicators (not shown), which are known in the art, are envisioned as an optional feature. The indicator might comprise a display and/or beep when the power is low (similar to some smoke detectors) to warn the authorized user of an impending deactivation of the weapon.

It should also be noted that in any of the above variations of the present invention, a solenoid is not the only way to extend/retract a latch, and any other suitable switching device could be employed. By way of illustration and not limitation, a motor, a relay, or any type of electro-mechanical switch could serve as a substitute for the solenoid. Reliability and a quick response time to activate/deactivate the switch are far more important than whether the switch is, for example, a solenoid.

FIG. 4B shows a semi-automatic pistol 440 having an external safety latch 445 that is pivotable against the portion 448 of trigger 450 in a locked position so as to prevent the weapon from being fired. The user prevention device according to the present invention may use a any known device, such as a motor, magnet, spring loaded switch, relay or any electro-mechanical switch to move the external safety latch from the locked position against the portion 448 of the trigger to an unlocked position shown in FIG. 4B. The signal to move the safety latch would be from the control unit/cpu after detecting that the user is authorized.

A external system similar to U.S. Pat. No. 6,185,852 could also be used to prevent the latch from movement, except that instead of using a "blocking disk" which is a shield that covers the external access to the latch, a magnet can hold the safety latch in the locked position until a signal is received by the control unit after a user's pressure signature is a match.

Figure 4C:
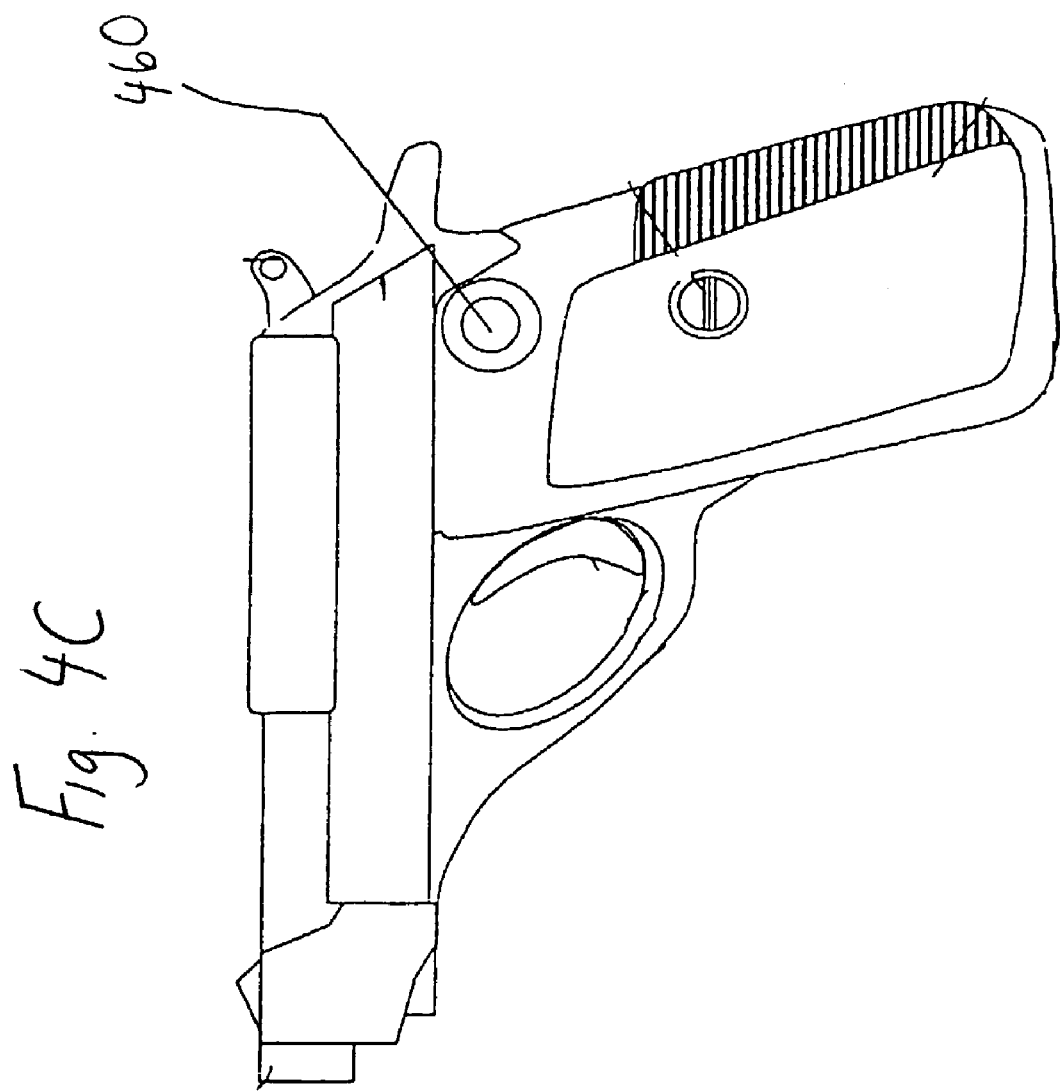

FIG. 4C shows a push-button type safety switch 460 that prevents the trigger from being activated. This type of switch can be blocked internally, by a rod/latch system connected to a solenoid, or any other type of electro-mechanical switch that in one position would prevent the switch from being moved to an unlocked position.

FIG. 5 is a flowchart illustrating the steps of a method for preventing an unauthorized user from operating a device.

At step 510, the storage of an authorized user's pressure signature profile based on (1) position of a user's hand on a handle of the device; (2) pressure as a function of position on the handle of the device; and (3) pressure as a function of time. While it is envisioned in this embodiment that the storage is in the device, it could be remotely stored, and even transmitted via RF to a central unit.

At step 520, there is sensing the pressure of a user gripping the handle of the device to compile a pressure signature based on the criteria recited in step 510.

At step 530, there is a comparing the pressure profile in step 520 with pressure profiles in storage.

At step 540, there is deactivating the safety interlock of the device if the comparison in step 530 finds a matching profile in storage.

Although not shown in FIG. 5, there is an optional step 525, which is a decision box that asks whether the number of previous non-matching attempts has exceeded a predetermined threshold. If the answer to step 525 is no, the flowchart would proceed to step 530. If the answer to step 525 is yes, the flowchart would proceed to a step parallel to step 540 (i.e. step 540B), which would permanently disable the weapon until reset by an authorized agent, such as a gun dealer, and/or state agency, etc. This version would also include an additional substep, which would be to update a counter if the user is unauthorized. This method will prevent an unauthorized user from trying to guess the pressure profile signature of an authorized user.

FIG. 6 shows a different application of an authorized user prevention device according to the present invention. A steering wheel 610 of a vehicle may either have sensors built in, or a steering wheel cover (not shown) could be attached over the steering wheel.

The unauthorized user prevention device could be located anywhere in the automobile, for example, in the steering column, under the dashboard, under the hood, in the trunk, etc. The device could be powered by the vehicle's battery. Similar to the pressure profile used for preventing unauthorized users from activating a weapon, a pressure profile from squeezing the steering wheel based on the three items (position, pressure and time) can be stored. There can be an ignition cutoff switch 620, fuel cutoff switch, etc. that would only be deactivated when the user squeezing the steering wheel matches a profile in storage, thus being an authorized user. The user could squeeze the wheel with a "secret handshake" (which can also be used with a weapon) that could be anywhere from just one finger to all ten. The number of possibilities, based on in part on the number of sensors and the number of combinations of fingers squeezing different areas at different pressure for different time periods would result in the chance of an unauthorized user gaining access as extremely remote being one in thousands or tens of thousands, as opposed to one in one hundred. A control unit or cpu 630 would compare the profiles and deactivate the interlock.

Figure 7:
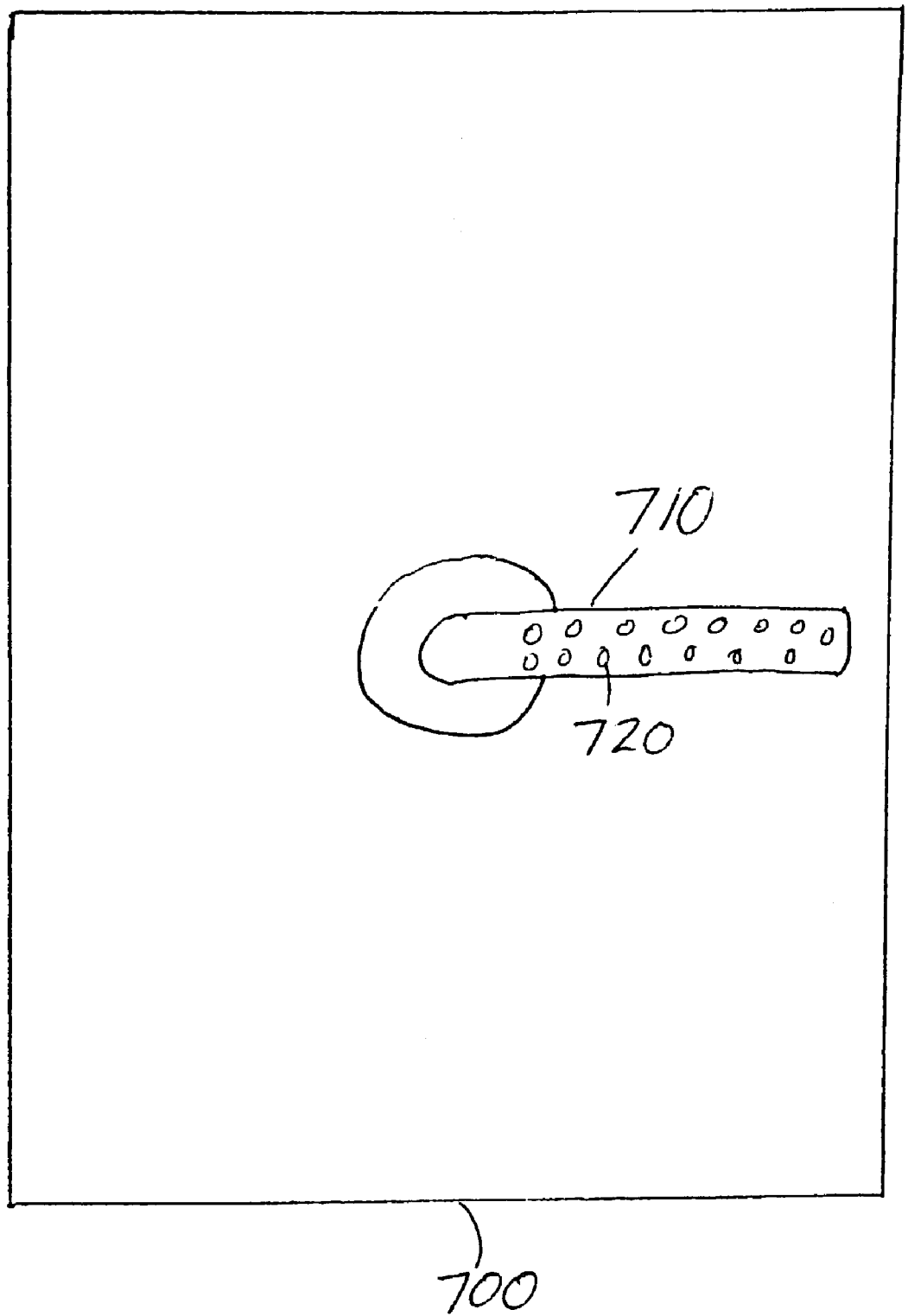
FIG. 7 illustrates an embodiment of the unauthorized user prevention device of the present invention used to permit keyless entry by a recognized grip of the door handle.

FIG. 7 also shows how the unauthorized user prevention device could work on a "keyless" door handle 710. A series of sensors 720 could be embedded in the door handle (it could also be a round knob (not shown) or a long handle (French style). Similar to the above device descriptions, the user gripping the door would create a pressure profile based on position, pressure and time. This profile could be compared with stored pressure profiles that would release the lock if the person gripping the door handle matches one of the profiles in storage. The cpu or control unit could be remotely located, and the sensor feedback could be transmitted to the control unit by wire, fiber optics, or RF.

With regard to unauthorized use of an aircraft, it should be understood by a person of ordinary skill in the art the present invention is not limited to any particular type of aircraft. For example, while the embodiments refer to airplanes, the aircraft can be a helicopter, commercial jumbo jet, cargo jet, private aircraft, electric/motorized hang-gliders, military aircraft, etc. In addition, the steering control of the aircraft may be hydraulically actuated, such as in most aircraft manufactured, for example, by the Boeing® Corporation, and fly-by-wire systems.

Figure 8:
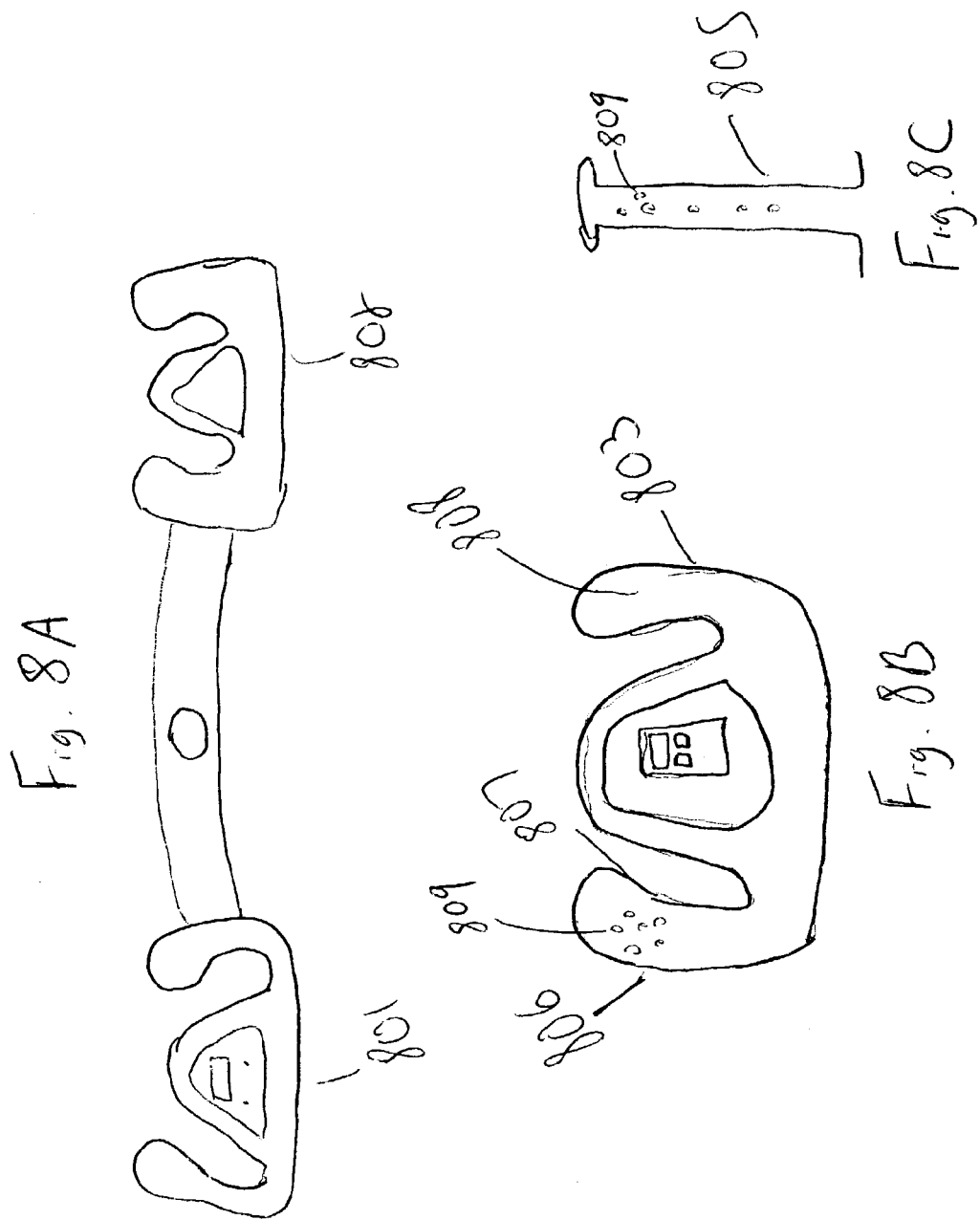
FIG. 8 illustrates an embodiment of the unauthorized user prevention device in a yoke of an aircraft.

FIGS. 8A–8C illustrate an embodiment of the present invention used in the yolk of an aircraft. It is understood by persons of ordinary skill in the art that the control grip could be either a conventional set of flight controls, or the increasingly common "fly-by-wire" systems.

The following description of primary flight controls, as published on the Internet by tpub.com and incorporated by reference in its entirety as background material, include the ailerons, elevator and rudder. The movement of the yoke or control stick directly affects both the ailerons and elevator. The ailerons are operated by a lateral (side-to-side) movement of a control stick 805 (shown in FIG. 8C) or a turning motion of the yoke 801,802,803 (shown in FIGS. 8A and 8B).

Ailerons are connected to work simultaneously but in opposite directions to each other. For example, if one aileron moves downward (thereby increasing lift on a wing), the other aileron will move upward (decreasing lift on an opposing wing (e.g. left versus right). The purpose of the aileron is to control roll of the aircraft due to unequal forces on the wings.

The elevators are controlled by moving the control stick or yoke according to "fore-and-aft" movement. Pulling back on the yoke or control stick raises the elevators, so as to cause the aircraft to ascend. Pushing the yoke or control stick forward lowers the elevators, causing the aircraft to descend (or dive, as the case may be).

The rudder is manipulated by foot pedals so as to move the aircraft about a vertical axis. Moving the rudder to the left will steer the aircraft tot he left, and moving the rudder to the right will steer the aircraft to the right. Stepping on the left or right rudder pedal will control movement of the rudder to the left or right, respectively. Most flight control systems for heavier and supersonic aircraft have power-assisted boost to help the pilot control the aircraft which is typically a hydraulic assist, but electric servo motors can also be used.

A basic autopilot system can be defined as a system that maintains stable altitude of an aircraft in flight by the automatic operation of the hydraulic actuators and/or electric servomotors. Autopilot systems control at least two axes of flight, one being the pitch (actuated by the elevator) and roll (actuated by the ailerons). The autopilot system may include a yaw damper for rudder control.

Autopilot can be a stand-alone system, but it may also be coupled to a flight management system or flight director. A flight management system can be defined as a complex system that is capable of being programmed with complex flight plan, included but not limited to landmarks, navigation frequencies, communication frequencies, flight profiles, route times, altitude and headings. Inputs can be accepted from the Global Positioning System (GPS), navigation systems, and even crew inputs. Flight Management Systems (FMS) can operate either in an advisory fashion, or can command the aircraft in conjunction with coupling to the autopilot. A Flight Director, on the other hand, is typically an aid to navigation system permitting the integration of several sources of information to provide the pilot with direction (information) about flying the aircraft. Flight Director typically has a vertical mode and a lateral mode, and inputs from computers, navigation frequencies, gyros, and compasses can be used, among others. The Flight Director can be used with the autopilot either engaged or disengaged.

According to an aspect of the present invention, an identification process for authorization of the pilot and/or co-pilot will be made according to the sensing of the grip on the yoke or control stick of the aircraft. The frequency that the pressure signature profile is compared is a matter of design choice, and can vary greatly.

Typically, the sensors would be placed along the areas of the yoke 806, 807, 808, where the pilot would typically hold onto the yoke. The sensors would also be placed along areas of the control stick.

In a first mode, if it appears after a predetermined number of retries that the grip on the yoke is unauthorized, the detection system can signal the Flight Management System and Auto Pilot that control of the aircraft, including its flight path, is to be followed by the preprogrammed inputs and manual manipulation of the yoke is ignored. There can be either a mechanical or electrical disengagement of the yoke/control stick from the hydraulic systems/electric servomotors that control the flight plan. In more sophisticated aircraft, even landing can be performed without pilot interaction, and in the case where it is determined that an unauthorized person is attempting to pilot the craft, these controls can either be automatically engaged, or if already engaged, can ignore attempts for disengagement by the unauthorized persons.

Upon notification that unauthorized users are detected, it is within the spirit and scope of the invention to automatically radio air traffic control for notification that the authorized pilots are no longer in control of the aircraft. In a more sophisticated embodiment, the air traffic control system could, for example, turn on cameras placed in the cockpit and passenger areas of the aircraft to observe whether the plane is actually hijacked. In addition, the Flight Management System can also be radioed by air traffic control and given a different flight plan than preprogrammed, so as to steer the plane away from large populated areas and out toward either open space or the ocean. The plane could also be commanded to fly in a holding pattern so as to give Air Force fighter jets sufficient time to reach the aircraft. It is also envisioned that, upon detection of unauthorized operation, the transponder cannot be turned off. In fact, if the transponder is first turned off prior to an authorized person grabbing the yoke of the aircraft, the system can automatically turn the transponder back on once the unauthorized operator is detected. One of the actions taken by the hijackers in the Sep. 11, 2001 attacks allegedly included turning the transponders off so the actual path of the highjacked planes was not identified. Thus, the present invention would permit better tracking of an aircraft in the event that a similar scenario is ever repeated.

Figure 9:
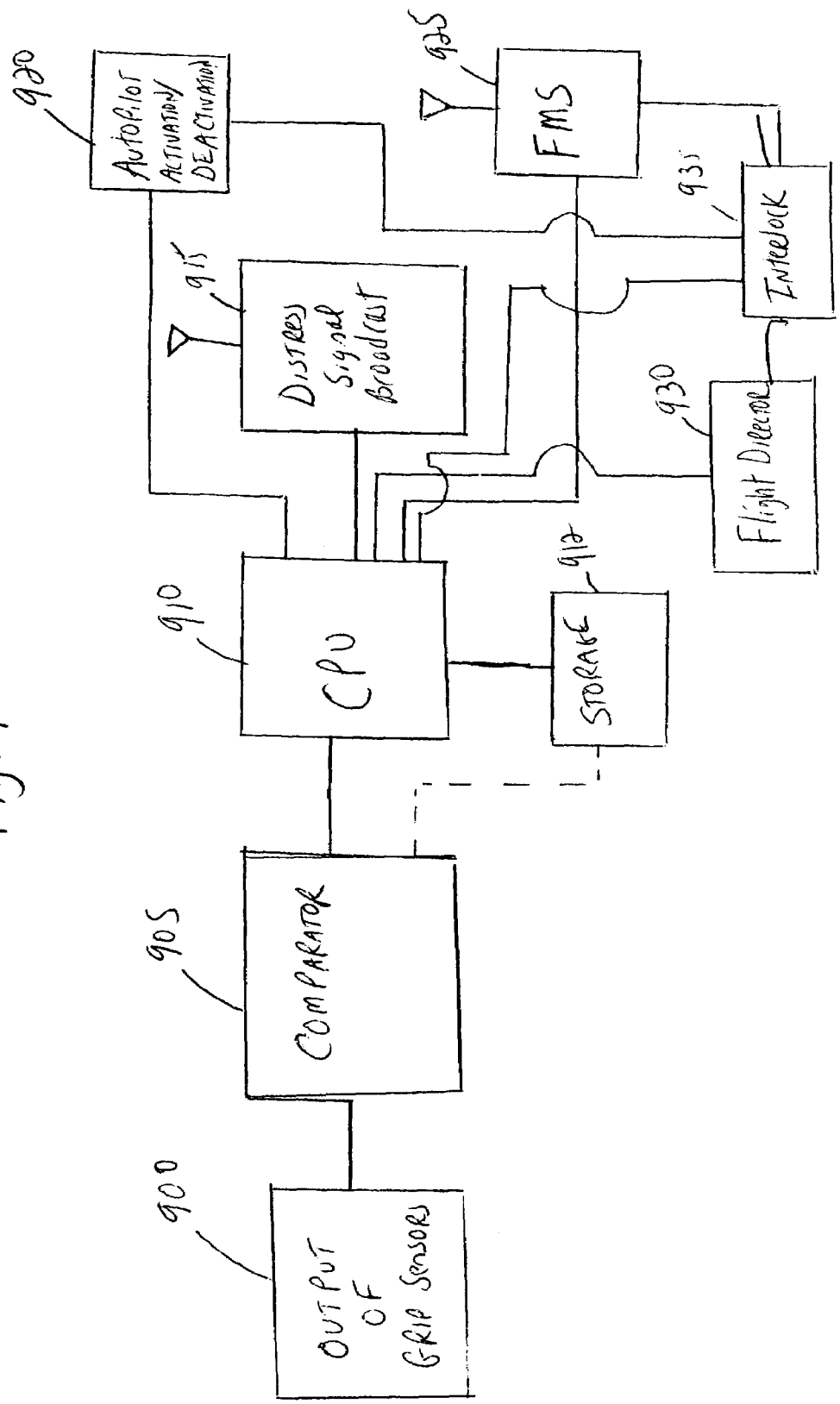
FIG. 9 illustrates a block diagram illustrating one of many ways that the unauthorized user prevention device could be used for control of aircraft.

As shown in FIG. 9, the output of grip sensors 900, which may or may not be an array of sensors arranged to detect the grip of the yoke and/or control stick, is directed to comparator 905. A control unit/cpu 910 can then process the electrical signals to develop a pressure signal profile including:

1) hand position of the user's handgrip on the yoke/control stick as indicated by a change in pressure on the sensor array/pressure sensors; and 2) pressure as a function of position on the yoke/control stick; and 3) pressure as a function of time.

The original pressure signature profile must be read into storage 912. This can be done by physically gripping the yoke several times under high security conditions prior to takeoff, and such information can remain in storage area 912.

Alternatively, the signature pressure profile for each person can be stored on a device such as a smart card, badge, diskette, cd rom, that the pilot/co-pilot could insert into an appropriate reader to obtain the signature profile.

It is also within the spirit of the invention and the scope of the appended claims that a person could key in an identification code and the pressure signature profile for that person could be downloaded from a central site via a variety of connections such as a wireless network, a wire network, a fiber optic connection, combinations of two or more of the same, and the like. In a particular aspect of the invention, it should be understood by persons of ordinary skill in the art that different aircraft may have different models of yokes/control sticks, so that, for example, it would be desirable for the pressure signature profile to be recorded for gripping each type of control mechanism used by a particular airline. Accordingly, the information downloaded could be specific to the particular yoke control/stick associated with the particular aircraft, or an entire profile could be downloaded, although this would be less efficient from a storage standpoint. In either case, whether the profile is coming from a central site, such as the airline itself or the FAA, or is read from a badge, diskette, or the like, there should be an ability or functionality to identify the profile according to the type of yoke and/or control stick used. Further, a badge or diskette reading of a pressure signature profile might only be permitted to be entered when the plane is grounded, or a special code entered, so as to prevent someone from bringing their own profile on board and trying to load it into the system via a reader or other instrumentality embodied in the system of that aircraft.

The control unit/CPU 910, upon receiving output of the comparator of a comparison of a stored profile with an instantaneous or interval-based profile, can determine whether such access is authorized or unauthorized. In the case of an unauthorized user, the control unit/cpu 910, may optionally perform one, some or all of the following procedures:

(1) activate a distress signal 915, that could be directed to an air traffic control tower, or on a military channel, other Rf channel, special distress channel, etc.;

(2) activate autopilot if the plane was in a "manual mode", or disabling deactivation of the autopilot if the profile does not show authorization;

(3) activate the flight management system (FMS) by itself, or in conjunction with, one of the autopilot and flight director. Optionally, the FMS can receive updated instructions from a military headquarters and/or FAA, radio tower, etc. that overrides the previously entered flight plan and directs the plan toward open space and/or the ocean, so as to minimize casualties and/or be intercepted by military aircraft. On more sophisticated aircraft, such as a Boeing 767, which can be automatically landed, it is within the spirit of the invention and scope of the appended claims to automatically signal the plane to land at, for example, a military installation or particular airport or landing area, so as to increase the possibility of a "forced landing" of the plane at a desired location in light of the unauthorized takeover.

(4) activate/deactivate the flight director.

In all of the above cases, the activation/deactivation may be performed via an interlock 935, with the interlock disabling/enabling manual control of the aircraft.

In the case of dual handgrip yokes, one or both sides may have grip detection, preferably both grips. It should also be understood that although the shape of yoke in FIGS. 8A and 8B are "U" shaped; they can be shaped in any form according to desire. In addition, the control stick does not have to be a straight rod, and can also be any space according to design choice. What is necessary is to deploy sufficient numbers of sensors so as to detect grip patterns along different portions of the yoke/control stick, as pilots may prefer grabbing the yoke/control stick at different positions.

Figure 10:
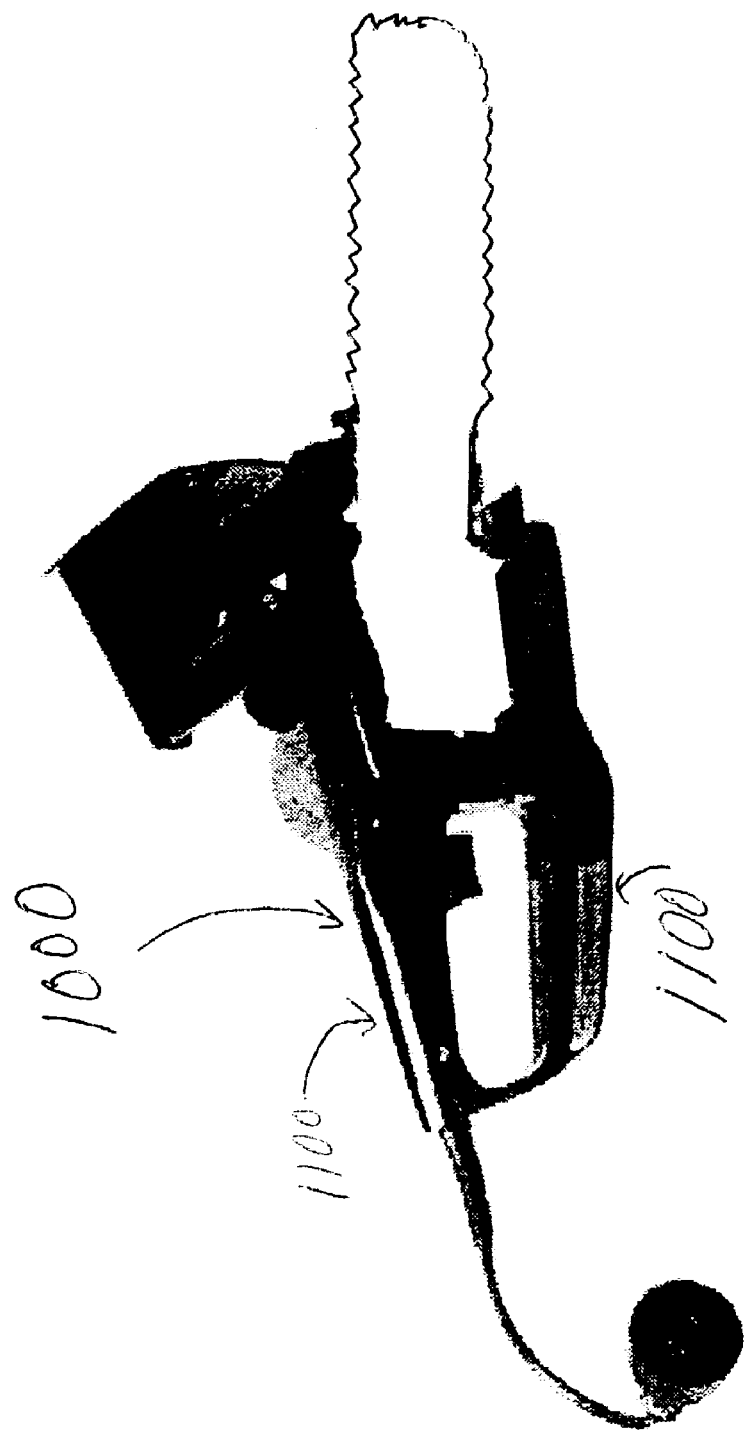
FIG. 10 illustrates an embodiment of the unauthorized user prevention device used as a safety for a power tool.

With regard to unauthorized use of power tools, virtually any type of tool, saw, torch, etc. that is handheld can benefit from the present invention. FIG. 10 shows a chainsaw 1000 having a handle 1100. Sensors may be arranged at portions of the handle, or at evenly spaced intervals, or in heavier concentrations where most people grip the tool, etc. according to need. It should be understood that the chainsaw is shown for illustrative purposes only, and the use of the grip detection in any other type of power tool, not just those that cut, is clearly within the spirit of the invention and the scope of the appended claims.

The pressure signature profile technology can also be used for mobile equipment, such as common carriers, buses, trains, magnetic-levitation devices, trolleys, vans, trans, cable cars, wagons, SUVs; hybrid vehicles (part truck-part automobile), tanks, all within the spirit of the invention and the scope of the appended claims.

With regard to heavy equipment the unauthorized use of which could cause injury, such equipment includes by way of nonlimiting example, construction equipment, such as tractors, cranes, concrete trucks, portable drilling and mining equipment, garbage trucks, vehicles for storage of hazardous materials, both radioactive and non-radioactive, tractor trailers, and flatbed trucks. Also included are cargo ships, passenger ships, boats, speed boats, yachts, private ships, commercial ships, trawlers, tug boats, cruise ships, ferries, and virtually any craft that can be used in water such as amphibious vehicles. The military could also restrict, for example, usage of a tank to a particular group of soldiers, so that if captured by the enemy, the tank could not be used by unauthorized persons against the rightful owner or others.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications, which are within its spirit and scope as defined by the claims.

What is claimed is:

1. An authorized pilot detection system for controlling an aircraft, said system comprising:
   an interlock for enabling/disabling one of a control wheel and a joystick for controlling movement of an aircraft;
   a biometric grip detector arranged on said one of a control and joy stick, said biometric grip detector comprising a plurality of pressure sensors for sensing a handgrip of a user on said one of a control wheel and joystick;
   comparator means for comparing a pressure signature profile compiled from an output from the plurality of pressure sensors with at least one pressure signature profile comprising:
   (a) hand position of the user's handgrip on said one of a control wheel and joystick as indicated by a change in pressure on at least one of the plurality of pressure sensors;
   (b) pressure as a function of position on said one of a control wheel and joystick; and
   (c) pressure as a function of time;
   control means for disabling the interlock to allow control of movement of the aircraft by said one of a control wheel and joy stick when said comparator means indicates that the signature profile compiled by said comparator means matches at least one pressure signature profile in storage,
   wherein said comparator means compares signature profiles sensed by the biometric grip detector at predetermined intervals during operation, and
   wherein said control means enables the interlock to prevent navigation of the aircraft by steering said one a control wheel and joystick, and said control means activates at least one of an autopilot, a flight director and a flight management system to control navigation of the aircraft automatically when a signature profile compiled by said comparator means does not match said at least one signature profile in storage.

2. The system according to claim 1, wherein said control means automatically broadcasts a distress signal to at least one air controller tower indicating unauthorized control of the aircraft has been attempted.

3. The system according to claim 2, wherein said control means automatically activates a first camera in a cockpit area and broadcasts video of a flight crew after unauthorized control of the aircraft has been attempted.

4. The system according to claim 3, wherein said control means also activates at least a second camera in the passenger area and broadcasts video of passengers of the passengers on the aircraft.

5. The system according to claim 2, wherein said control means automatically disables an on/off switch of a transponder of the aircraft when unauthorized control of the aircraft has been attempted, said transponder remaining on until a reset code is entered, said reset code not being provided to said pilot.

6. The system according to claim 2, wherein said control means automatically turns a transponder on if an unauthorized control of the aircraft has been attempted and automatically disables an on/off switch of a transponder of the aircraft when unauthorized control of the aircraft has been attempted, said transponder remaining on until a reset code is entered, said reset code not being provided to said pilot.

7. The system according to claim 1, wherein each authorized user has a signature profile of a first grip for normal operation of the aircraft, and at least one predetermined distress grip which causes the control means to broadcast that the aircraft is being navigated under duress.

8. The system according to claim 1, wherein the interlock is enabled by one of a central site and an air traffic control center.

9. The system according to claim 1, wherein the aircraft steering is hydraulically actuated, and the interlock disables said one of a joystick and control wheel from actuating the aircraft steering.

10. The system according to claim 1, wherein the aircraft is electronically controlled by a fly-by-wire system, and the interlock disables electrical control signals from said one of a control wheel and joystick.

11. A system for preventing unauthorized use of a power tool, said system comprising:
  a biometric grip detector arranged on said power tool, said biometric grip detector comprising a plurality of pressure sensors for sensing a handgrip of a user on said one power tool;
  comparator means for comparing a pressure signature profile compiled from an output from the plurality of pressure sensors with at least one pressure signature profile comprising:
  (a) hand position of the user's handgrip on said power tool as indicated by a change in pressure on at least one of the plurality of pressure sensors;
  (b) pressure as a function of position on said power tool; and
  (c) pressure as a function of time;
  control means for disabling the interlock for a predetermined amount of time to allow operation of said power tool when said comparator means indicates that the signature profile compiled by said comparator means matches at least one pressure signature profile in storage, and
  wherein said comparator means compares signature profiles sensed by the biometric grip detector at predetermined intervals during operation.

12. The system according to claim 11, wherein said power tool is a one of a chainsaw, bandsaw, rivet gun, nail gun, sander, tile cutter, jackhammer.

13. A system for preventing unauthorized use of mobile equipment, said system comprising:
  an interlock for enabling/disabling an accelerator/throttle and a braking system, to prevent movement of the heavy equipment;
  a biometric grip detector arranged on one of a steering wheel and a joystick, said biometric grip detector comprising a plurality of pressure sensors for sensing a handgrip of a user on said one of a steering wheel and joystick;
  comparator means for comparing a pressure signature profile compiled from an output from the plurality of pressure sensors with at least one pressure signature profile comprising:
  (a) hand position of the user's handgrip on said one of a steering wheel and joystick as indicated by a change in pressure on at least one of the plurality of pressure sensors;
  (b) pressure as a function of position on said one of a control wheel and joystick; and
  (c) pressure as a function of time;
  control means for disabling the interlock to allow throttle/accelerator to cause the heavy equipment to move when said comparator means indicates that the signature profile compiled by said comparator means matches at least one pressure signature profile in storage,
  wherein said comparator means compares signature profiles sensed by the biometric grip detector at predetermined intervals during operation, and
  wherein said control means enables the interlock to prevent movement of the heavy equipment by engaging a braking system and optionally disengaging the throttle/accelerator automatically when a signature profile compiled by said comparator means does not match said at least one signature profile in storage.

14. A method for detecting pilot authorization for controlling an aircraft, said method comprising the steps of:
  (a) providing an interlock for enabling/disabling one of a control wheel and a joystick for controlling movement of an aircraft;
  (b) providing a biometric grip detector arranged on said one of a control and joy stick, said biometric grip detector comprising a plurality of pressure sensors for sensing a handgrip of a user on said one of a control wheel and joystick;
  (c) comparing by comparator means a pressure signature profile compiled from an output from the plurality of pressure sensors with at least one pressure signature profile comprising:
  (i) hand position of the user's handgrip on said one of a control wheel and joystick as indicated by a change in pressure on at least one of the plurality of pressure sensors;
  (ii) pressure as a function of position on said one of a control wheel and joystick; and
  (iii) pressure as a function of time;
  (d) disabling the interlock by a control means to permit at least partial manual control of the aircraft by said one of a control wheel and joy stick only when said comparator means indicates that the signature profile compiled by said comparator means matches at least one pressure signature profile in storage.

15. The method according to claim 14, wherein said comparator means compares signature profiles sensed by the biometric grip detector at predetermined intervals during operation.

16. The method according to claim 14, wherein said control means enables the interlock to prevent navigation of the aircraft by steering said one a control wheel and joystick, and said control means activates at least one of an autopilot, a flight director and a flight management system to control navigation of the aircraft automatically and disregard manual attempts at maneuvering when a signature profile compiled by said comparator means does not match said at least one signature profile in storage.

17. The method according to claim 14, wherein said control means automatically broadcasts a distress signal to at least one air controller tower indicating unauthorized control of the aircraft has been attempted.

18. The method according to claim 14, wherein said control means automatically activates a first camera in a cockpit area and broadcasts video of a flight crew after unauthorized control of the aircraft has been attempted.

19. The method according to claim 18, wherein said control means also activates at least a second camera in the passenger area and broadcasts video of passengers of the passengers on the aircraft.

20. The system according to claim 14, wherein said control means automatically disables an on/off switch of a transponder of the aircraft when unauthorized control of the aircraft has been attempted, said transponder remaining on until a reset code is entered, said reset code not being provided to said pilot.

21. The system according to claim 14, wherein said control means automatically turns a transponder on if an unauthorized control of the aircraft has been attempted and automatically disables an on/off switch of a transponder of the aircraft when unauthorized control of the aircraft has been attempted, said transponder remaining on until a reset code is entered, said reset code not being provided to said pilot.

22. The method according to claim 14, wherein each authorized user has a signature profile of a first grip for normal operation of the aircraft, and at least one predetermined distress grip which causes the control means to broadcast that the aircraft is being navigated under duress.

23. The method according to claim 14, wherein the interlock is enabled by one of a central site and an air traffic control center.

24. The method according to claim 14, wherein the aircraft steering is hydraulically actuated, and the interlock disables said one of a joystick and control wheel from actuating the aircraft steering.

25. The method according to claim 14, wherein the aircraft is electronically controlled by a fly-by-wire system, and the interlock disables electrical control signals from said one of a control wheel and joystick.

26. A method for preventing unauthorized use of a power tool, said method comprising the steps of:
(a) arranging a biometric grip detector on said power tool, said biometric grip detector comprising a plurality of pressure sensors for sensing a handgrip of a user on said one power tool;
(b) providing an output of the handgrip sensed by the pressure sensors by comparator means for comparing a pressure signature profile compiled from an output from the pressure sensors with at least one pressure signature profile comprising:
(i) hand position of the user's handgrip on said power tool as indicated by a change in pressure on at least one of the plurality of pressure sensors;
(ii) pressure as a function of position on said power tool; and
(iii) pressure as a function of time;
control means for disabling the interlock for a predetermined amount of time to allow operation of said power tool when said comparator means indicates that the signature profile compiled by said comparator means matches at least one pressure signature profile in storage, and
wherein said comparator means compares signature profiles sensed by the biometric grip detector at predetermined intervals during operation.

27. The method according to claim 26, wherein said power tool is a one of a chainsaw, bandsaw, rivet gun, nail gun, sander, tile cutter, jackhammer, torch.

28. A method for preventing unauthorized use of mobile equipment, said method comprising:
(a) providing an interlock for enabling/disabling an accelerator/throttle and a braking system, to prevent movement of the heavy equipment;
(b) arranging a biometric grip detector on one of a steering wheel and a joystick, said biometric grip detector comprising a plurality of pressure sensors for sensing a handgrip of a user on said one of a steering wheel and joystick;
(c) comparing by comparator means an output of the pressure sensors with a pressure signature profile from storage, said pressure signature profile comprising:
(i) hand position of the user's handgrip on said one of a steering wheel and joystick as indicated by a change in pressure on at least one of the plurality of pressure sensors;
(ii) pressure as a function of position on said one of a control wheel and joystick; and
(iii) pressure as a function of time;
control means for disabling the interlock to allow throttle/accelerator to cause the heavy equipment to move when said comparator means indicates that the signature profile compiled by said comparator means matches at least one pressure signature profile in storage.

29. The method according to claim 28, wherein said comparator means compares signature profiles sensed by the biometric grip detector at predetermined intervals during operation.

30. The method according to claim 28, wherein said control means enables the interlock to prevent movement of the heavy equipment by engaging a braking system and optionally disengaging the throttle/accelerator automatically when a signature profile compiled by said comparator means does not match said at least one signature profile in storage.

* * * * *